(12) United States Patent
Barker et al.

(10) Patent No.: US 11,261,971 B2
(45) Date of Patent: Mar. 1, 2022

(54) DOUBLE ANGLED BRUSH SEAL

(71) Applicant: United Technologies Corporation, Farmington, CT (US)

(72) Inventors: William M. Barker, North Andover, MA (US); Caleb J. Farley, Waterboro, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 142 days.

(21) Appl. No.: 16/679,822

(22) Filed: Nov. 11, 2019

(65) Prior Publication Data

US 2021/0140546 A1    May 13, 2021

(51) Int. Cl.
*F16J 15/3288* (2016.01)
*F01D 11/00* (2006.01)
*F01D 11/08* (2006.01)

(52) U.S. Cl.
CPC ......... *F16J 15/3288* (2013.01); *F01D 11/001* (2013.01); *F01D 11/005* (2013.01); *F01D 11/08* (2013.01); *F05D 2220/323* (2013.01); *F05D 2230/234* (2013.01); *F05D 2230/60* (2013.01); *F05D 2240/56* (2013.01); *F05D 2300/6033* (2013.01)

(58) Field of Classification Search
CPC ...... F16J 15/00; F16J 15/3288; F16J 15/3268; F16J 15/3272; F16J 15/328; F16J 15/3284; F01D 11/00; F01D 11/001; F01D 11/005; F01D 11/08; F01D 11/10; F01D 5/20; F01D 2220/00; F01D 2220/323; F01D 2220/324; F01D 2230/00; F01D 2230/234; F01D 2230/60; F01D 2240/00; F01D 2240/55; F01D 2240/56; F01D 2300/00; F01D 2240/60; F01D 2240/6033
USPC ........................................................ 277/355
See application file for complete search history.

(56) References Cited

U.S. PATENT DOCUMENTS

| | | | |
|---|---|---|---|
| 6,173,958 B1 * | 1/2001 | Dine .................. | F01D 9/023 277/303 |
| 6,352,263 B1 * | 3/2002 | Gail ................... | F16J 15/3288 277/355 |
| 6,808,180 B2 * | 10/2004 | Shore ................. | F16J 15/3288 277/355 |
| 7,093,835 B2 * | 8/2006 | Addis ................. | F01D 11/005 277/355 |
| 9,322,287 B2 | 4/2016 | Zheng et al. | |
| 9,587,505 B2 * | 3/2017 | Mukhopadhyay ...... | F01D 11/08 |

(Continued)

FOREIGN PATENT DOCUMENTS

| | | |
|---|---|---|
| EP | 2960440 | 12/2015 |
| EP | 2990699 | 3/2016 |

OTHER PUBLICATIONS

Extended EP Search Report for EP Application N, 20206782.3 dated Mar. 5, 2021.

*Primary Examiner* — Nathan Cumar

(74) *Attorney, Agent, or Firm* — Carlson, Gaskey & Olds, P.C.

(57) ABSTRACT

A brush seal includes a first plate and a second plate. A plurality of bristles have a first end and a second end. The plurality of bristles are arranged between the first and second plates such that the first and second ends extend beyond the first and second plates. The first end is arranged at an angle relative to the second end.

20 Claims, 5 Drawing Sheets

(56) References Cited

U.S. PATENT DOCUMENTS

| | | | |
|---|---|---|---|
| 2015/0198251 A1* | 7/2015 | Beichl | F16J 15/328 |
| | | | 277/355 |
| 2016/0061330 A1* | 3/2016 | Davis | F16J 15/3268 |
| | | | 277/355 |
| 2017/0306782 A1* | 10/2017 | Shah | F01D 9/041 |
| 2018/0119560 A1* | 5/2018 | Paulino | F01D 11/003 |

* cited by examiner

DOUBLE ANGLED BRUSH SEAL

BACKGROUND

This application relates to a brush seal arrangement, such as for use in a blade outer air seal assembly.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades. Blade outer air seals have been proposed made of ceramic matrix composite fiber layers.

SUMMARY OF THE INVENTION

In one exemplary embodiment, a brush seal includes a first plate and a second plate. A plurality of bristles have a first end and a second end. The plurality of bristles are arranged between the first and second plates such that the first and second ends extend beyond the first and second plates. The first end is arranged at an angle relative to the second end.

In a further embodiment of any of the above, each of the bristles in the plurality of bristles extends from the first end to the second end.

In a further embodiment of any of the above, the plurality of bristles comprises a first group and a second group. The first group has the first end and the second group has the second end.

In a further embodiment of any of the above, the angle is between about 90° and about 170°.

In a further embodiment of any of the above, the angle is about 90°.

In a further embodiment of any of the above, the brush seal is configured to extend circumferentially about an axis.

In a further embodiment of any of the above, the brush seal is a full hoop that extends about the axis.

In a further embodiment of any of the above, the brush seal is a split ring that extends about the axis.

In a further embodiment of any of the above, the brush seal is formed from a plurality of segments that are arranged about the axis.

In a further embodiment of any of the above, the first end is configured to seal against a first surface. The second end is configured to seal against a second surface.

In a further embodiment of any of the above, the first surface is a generally radial surface. The second surface is a generally axial surface.

In a further embodiment of any of the above, the first and second surfaces are within a blade outer air seal assembly.

In another exemplary embodiment, a blade outer air seal assembly includes a blade outer air seal that has a plurality of segments that extend circumferentially about an axis and are mounted in a carrier. At least one of the plurality of segments has a base portion that extends from a first axial side to a second axial side. A brush seal is arranged at one of the first and second axial sides. The brush seal has a plurality of bristles that have a first end and a second end. The first end is arranged at an angle relative to the second end. The first end is engaged with the at least one segment and the second end is engaged with another structure.

In a further embodiment of any of the above, the angle is between about 90° and about 170°.

In a further embodiment of any of the above, the angle is about 90°.

In a further embodiment of any of the above, the plurality of bristles are arranged between a first plate and a second plate. The first and second plates are shaped to form the angle.

In a further embodiment of any of the above, a gap is formed between the second plate and the bristles to permit the bristles to move relative to the first and second plates.

In a further embodiment of any of the above, the another structure is a generally radial surface.

In a further embodiment of any of the above, the at least one segment is formed from a ceramic material.

In a further embodiment of any of the above, the plurality of bristles are a cobalt material.

DETAILED DESCRIPTION

Figure 1:
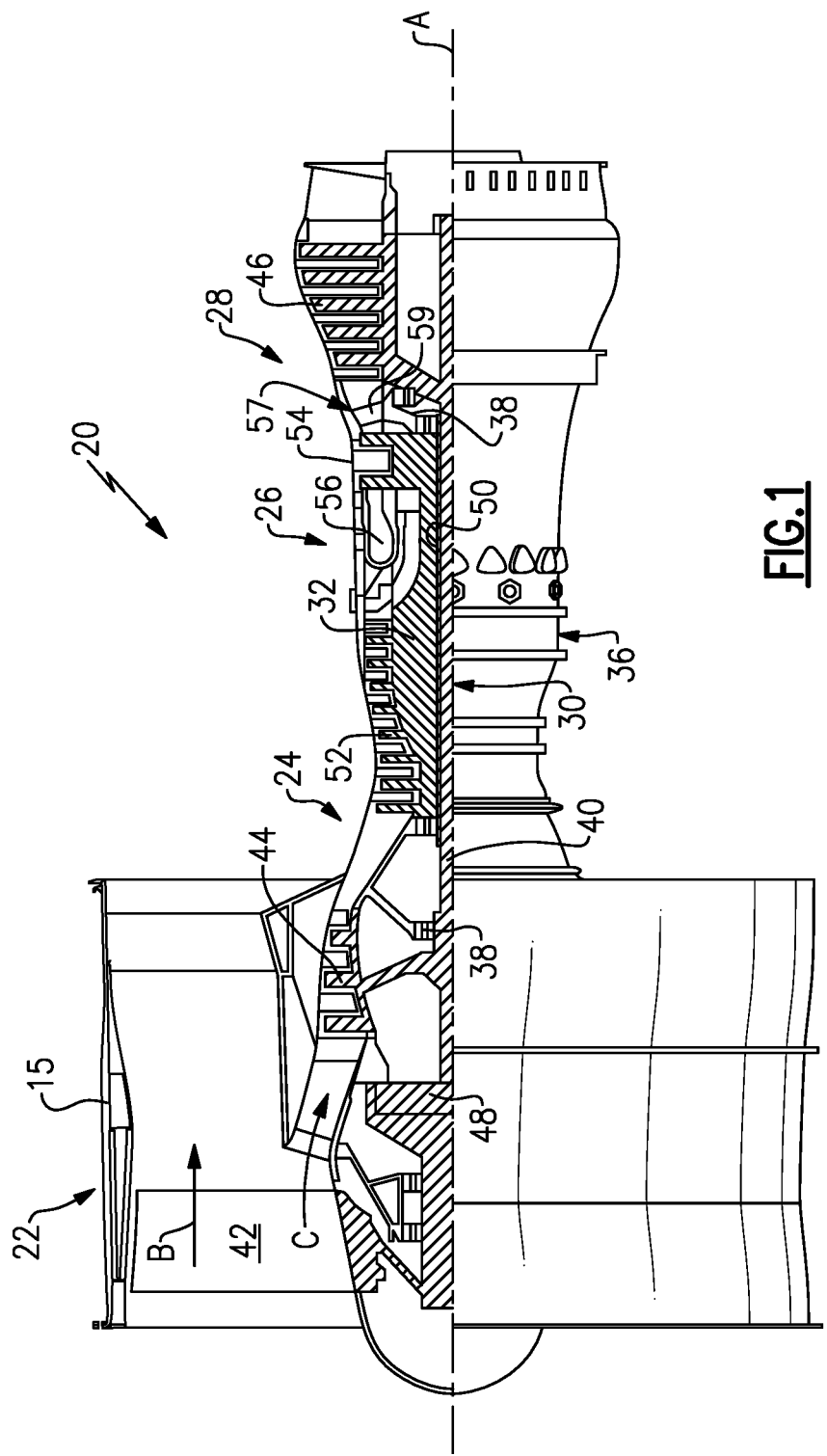
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
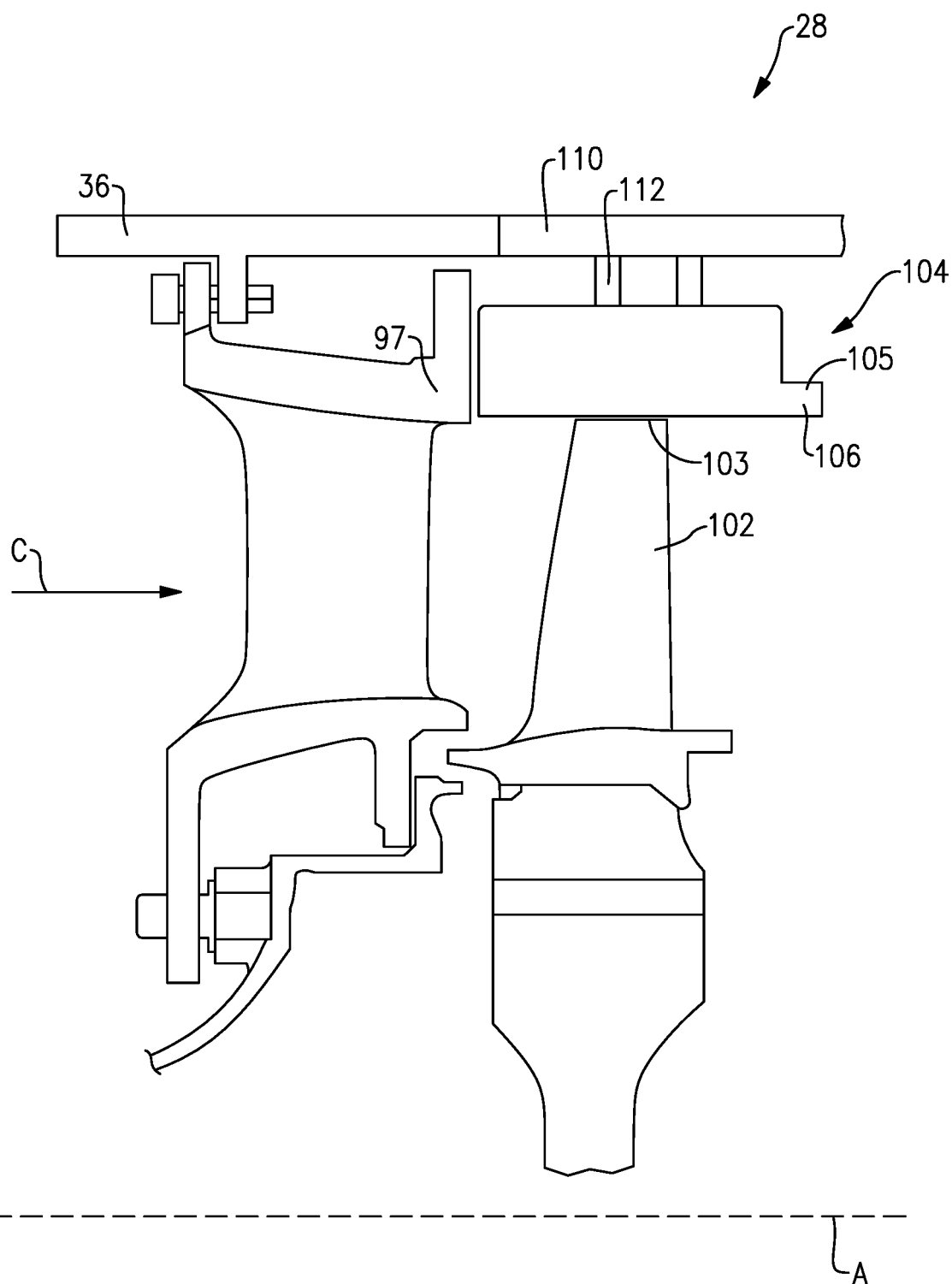
FIG. 2 schematically illustrates an example turbine section.

FIG. 2 shows a portion of an example turbine section 28, which may be incorporated into a gas turbine engine such as the one shown in FIG. 1. However, it should be understood that other sections of the gas turbine engine 20 or other gas turbine engines, and even gas turbine engines not having a fan section at all, could benefit from this disclosure. The turbine section 28 includes a plurality of alternating turbine blades 102 and turbine vanes 97.

A turbine blade 102 has a radially outer tip 103 that is spaced from a blade outer air seal assembly 104 with a blade outer air seal ("BOAS") 106. The BOAS 106 may be made up of a plurality of seal segments 105 that are circumferentially arranged in an annulus about the central axis A of the engine 20.

The BOAS 106 may be mounted to an engine case or structure, such as engine static structure 36 via a control ring or support structure 110 and a carrier 112. The engine structure 36 may extend for a full 360° about the engine axis A. The support structure 110 and/or carrier 112 may be segmented, in some examples. The engine structure 36 may support the support structure 110 via a hook or other attachment means. The engine case or support structure holds the BOAS 106 radially outward of the turbine blades 102.

Figure 3:
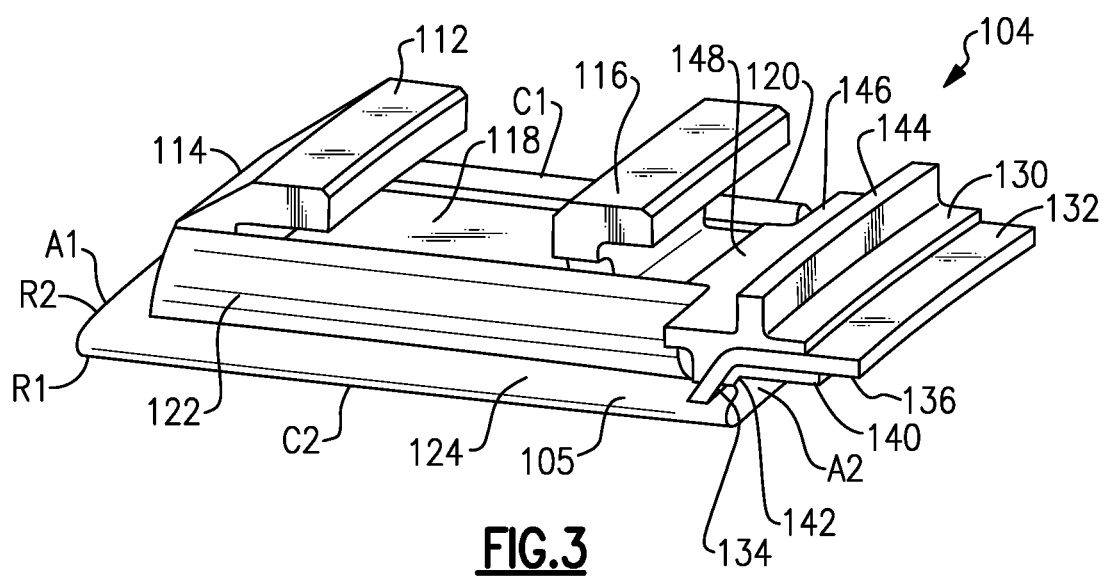
FIG. 3 illustrates an exemplary blade outer air seal assembly.

FIG. 3 illustrates an example BOAS assembly 10. Each seal segment 105 is a body that defines radially inner and outer sides R1, R2, respectively, first and second axial sides A1, A2, respectively, and first and second circumferential sides C1, C2, respectively. The radially inner side R1 faces in a direction toward the engine central axis A. The radially inner side R1 is thus the gas path side of the seal segment 105 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

In the illustrated example, each BOAS segment 105 includes a first wall 120 circumferentially spaced from a second wall 122. The first and second walls 120, 122 extend generally radially outward from a base portion 124. The first and second walls 120, 122 extend along a portion of an axial length of the seal segment 105. In the illustrated example, the first and second walls 120, 122 are substantially parallel to one another. The first and second walls 120, 122 may be arranged at an angle extending towards one another for attachment to the carrier 112. The base portion 124 extends between the first and second axial sides A1, A2 and defines a gas path on a radially inner side and a non-gas path on a radially outer side. In this disclosure, forward, aft, upstream, downstream, axial, radial, or circumferential is in relation to the engine axis A unless stated otherwise.

The BOAS 106 may be formed of a ceramic matrix composite ("CMC") material. Each seal segment 105 is formed of a plurality of CMC laminates. The laminates may be silicon carbide fibers, formed into a braided or woven fabric in each layer. In other examples, the BOAS 106 may be made of a monolithic ceramic.

CMC components such as BOAS segments 105 are formed by laying fiber material, such as laminate sheets or braids, in tooling, injecting a gaseous infiltrant into the tooling, and reacting to form a solid composite component. The component may be further processed by adding additional material to coat the laminates. The simple arrangement of the base portion 124 and first and second walls 120, 122 allows for a simple ply layup.

The carrier 112 attaches the BOAS segment 105 to an engine support structure. The carrier 112 has a first hook 114 and a second hook 116 extending from a platform 118. The platform 118 engages with the first and second walls 120, 122 of the BOAS segment 105. The first and second hooks 114, 116 engage with the engine support structure. The carrier 112 may be a metallic material, for example.

A brush seal 130 is arranged near the second axial side A2. The brush seal 130 generally includes a plurality of bristles 132 having a first end 134 and a second end 136. The bristles 132 are arranged between a first plate 146 and a second plate 140. The first end 134 of the bristles extends beyond the plates 146, 140 to engage a first surface, and the second end 136 extends beyond the plates 146, 140 to engage a second surface. The first end 134 of the bristles 132 are arranged at an angle relative to the second end 136 of the bristles 132. Thus, the bristles 132 of a single brush seal 130 are configured to engage two separate surfaces. In the illustrated example, the first end 134 engages a generally axially extending surface of the BOAS segment 105, while the second end 136 may engage a generally radially extending surface. The generally radially extending surface may be a portion of a vane, for example. The angled bristle arrangement permits a single brush seal 130 to seal against two surfaces that are not parallel to one another.

The brush seal 130 extends circumferentially about the engine axis A. In one example, the brush seal 130 is a full hoop extending about the axis A. In this example, the brush seal 130 may be welded to the carrier 112. In another example, the brush seal 130 is a split ring extending about the axis A. The split ring is split in one spot to allow the brush seal 130 to grow or shrink as temperatures change. This arrangement may reduce stresses in the part and reduce creep stresses. In yet another example, the brush seal 130 is formed from a plurality of segments arranged circumferentially about the axis A.

Figure 4:
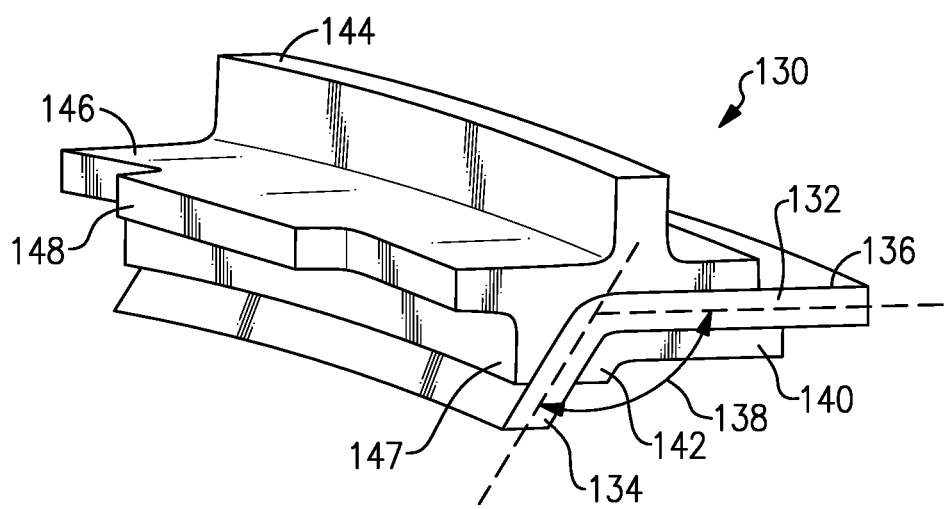
FIG. 4 illustrates an exemplary brush seal.

Referring to FIG. 4, and with continued reference to FIG. 3, the brush seal 130 has features to engage with surrounding structure. The first plate 146 extends generally axially and has a radial rail 144, for example. A tab 148 may extend generally axially and forward from the first plate 146 for engagement with the carrier 112. The tab 148 helps to transfer load onto the carrier 112 to avoid stresses through the CMC material of the BOAS segment 105. A radially inwardly extending portion 147 defines an angle for the bristles 132. Although the brush seal 130 is shown in a particular orientation, other orientations may fall within the scope of this disclosure. For example, the first end 134 of the bristles may extend radially inward, radially outward, axially forward, and/or axially backward.

The first end 134 and the second end 136 of the bristles 132 form an angle 138 with respect to one another. The shape of the first and second plates 146, 140 forms a bend in the bristles 132 to define the angle 138. In one example, the angle 138 is between about 90° and 170°. In a further example, the angle 138 is about 110°. The plurality of bristles 132 may be a metallic material. In one example, the bristles 132 are a cobalt material. The bristles 132 may be a material that wears well with CMC materials for use in CMC BOAS assemblies, for example.

Figure 5A:
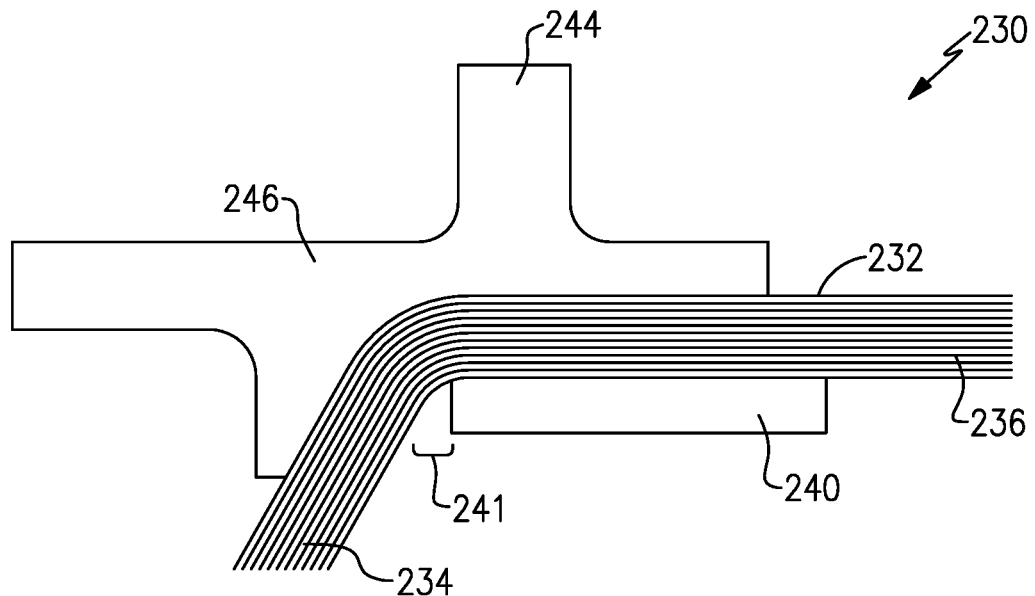
FIG. 5A illustrates a cross-sectional view of another exemplary brush seal.

FIGS. 5A-5D illustrate cross-sectional views of other exemplary brush seals. In the example of FIG. 5A, a gap 241 is formed between the bristles 232 and the second plate 240. The gap 241 may be near the first end 234 of the bristles 232, for example. The gap 241 may permit movement of the first end 234 of the bristles 232 relative to the first and second plates 246, 240. In some embodiments, the gap 241 is formed by a chamfer on the second plate 240.

Figure 5B:
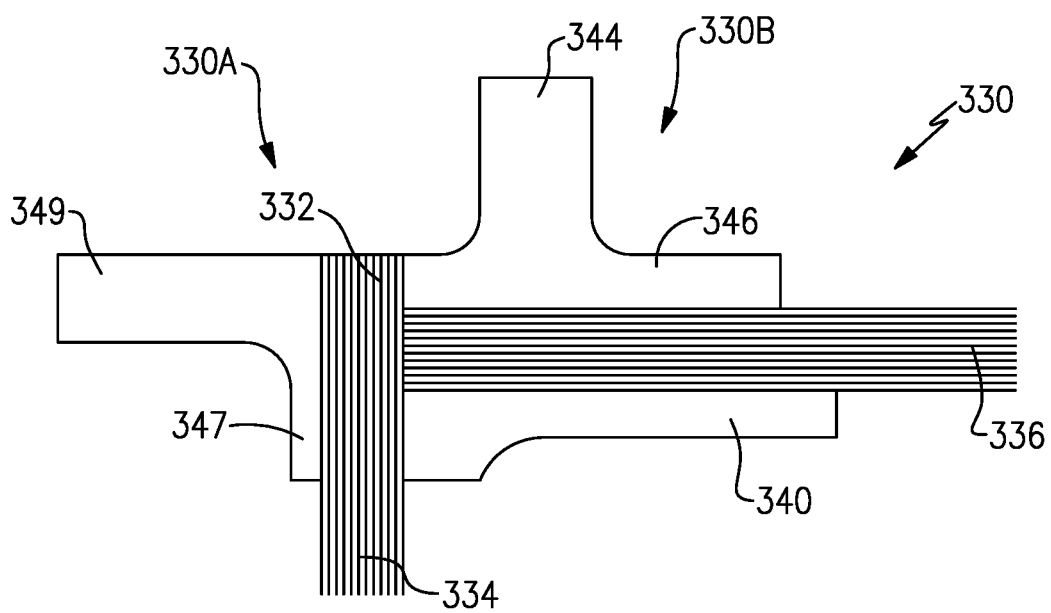
FIG. 5B illustrates a cross-sectional view of another exemplary brush seal.

In the example of FIG. 5B, the seal 330 is formed from a radial portion 330A and an axial portion 330B. In this example, the first end 334 is formed from a first group of bristles, and the second end 336 is formed from a second group of bristles. The axial portion 330B may be formed first by joining the first plate 346 and second plate 340 with the second end 336 of the bristles 332. The axial portion 330B may be welded together, for example. In a further example, the axial portion 330B is laser welded. The axial portion 330B may then be used as a backing plate to form the radial portion 330A. A plate 349 may be used to secure the first end 334 of the bristles 332, for example. The first and second radial portions 330A, 330B may be welded together, for example. In this example, the first and second ends 334, 336 of the bristles 332 are at a right angle relative to one another. In other examples, the first and second ends 334, 336 may be arranged at a different angle.

Figure 5C:
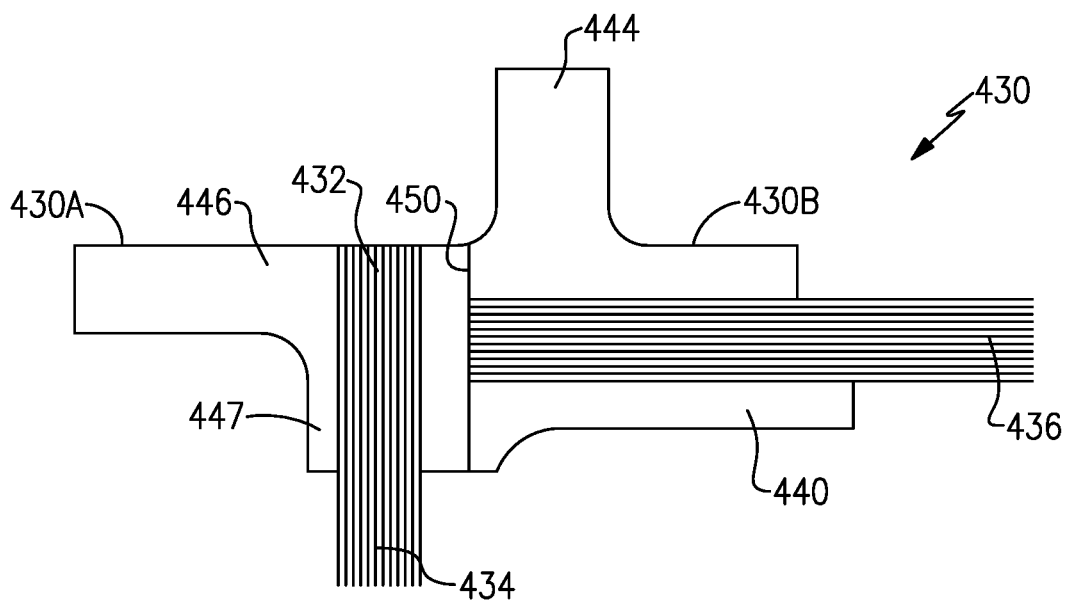
FIG. 5C illustrates a cross-sectional view of another exemplary brush seal.

In the example of FIG. 5C, the seal 430 is formed from a radial portion 430A and an axial portion 430B. The radial and axial portions 430A, 430B may be separately formed. The radial and axial portions 430A, 430B are then joined together at a seam 450. The radial and axial portions 430A, 430B may be joined by welding, such as laser welding. In this example, the radial rail 444 is arranged on the axial portion 430B.

Figure 5D:
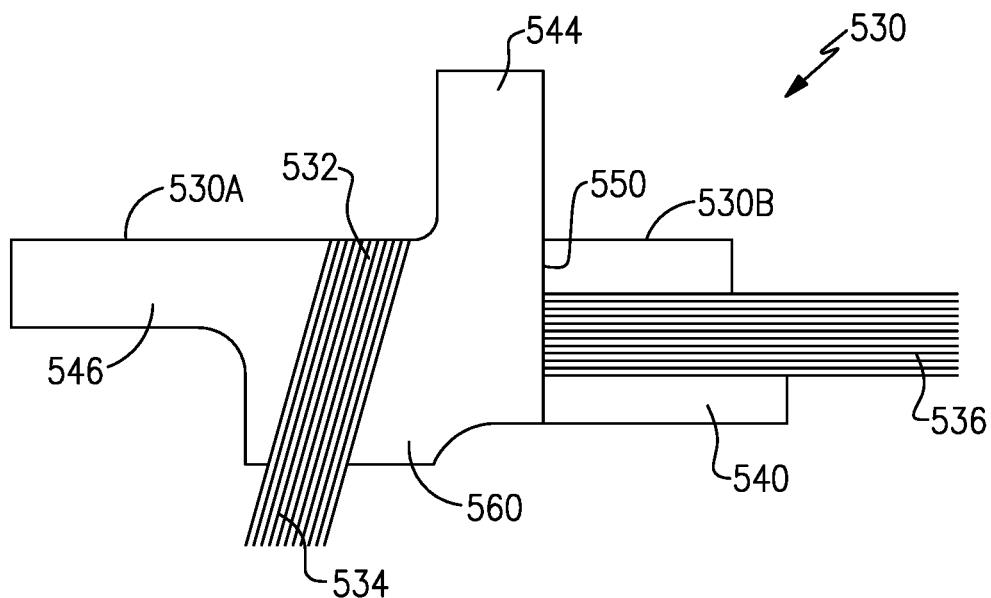
FIG. 5D illustrates a cross-sectional view of another exemplary brush seal.

In the example of FIG. 5D, the seal 530 is formed from a radial portion 530A and an axial portion 530B. The radial and axial portions 530A, 530B may be separately formed. In this example, first end 534 of the bristles 532 in the radial portion 530A are arranged at an angle other than 90° to the second end 536. The angle is defined by an angled portion 560 of the radial portion 530A. In this example, the radial rail 544 is arranged on the radial portion 530A.

Although a particular orientation of each brush seal 130, 230, 330, 430, 530 is shown, each of these brush seals may be used in a different orientation. For example, the radial portions could instead extend axially, and the axial portions could extend radially. The radial portion could extend radially inward or outward, and the axial portion could axially forward or aftward. Although shown in a BOAS assembly 104, the brush seals 130, 230, 330, 430, 530 may be used with other components within the engine 20. Although a BOAS assembly 104 is a static part, the brush seals 130, 230, 330, 430, 530 could be used for rotating parts.

Known brush seals seal against a single surface, or two parallel surfaces. Thus, two different seals would be required to seal against non-parallel surfaces. The disclosed brush seal arrangement permits a single brush seal to seal against two non-parallel surfaces by angling the bristles. This achieves sealing with a single seal, as opposed to requiring two separate seals. The disclosed arrangement can be used in areas with limited packaging space by eliminating the need for a second brush seal, for example. Using only a single brush seal for two surfaces may also eliminate leak paths in the assembly.

In this disclosure, "generally axially" means a direction having a vector component in the axial direction that is greater than a vector component in the circumferential direction, "generally radially" means a direction having a vector component in the radial direction that is greater than a vector component in the axial direction and "generally circumferentially" means a direction having a vector component in the circumferential direction that is greater than a vector component in the axial direction.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A brush seal, comprising:
a first plate, a second plate, and a third plate; and
a plurality of bristles comprising a first group and a second group, the first group having a first end and the second group having a second end, the plurality of bristles arranged between the first, second, and third plates such that the first end extends beyond the first plate and the third plate and the second end extends beyond the first, and second plates, wherein the first end is arranged at an angle relative to the second end.

2. The brush seal of claim 1, wherein the angle is between about 90° and about 170°.

3. The brush seal of claim 1, wherein the angle is about 90°.

4. The brush seal of claim 1, wherein the brush seal is configured to extend circumferentially about an axis.

5. The brush seal of claim 4, wherein the brush seal is a full hoop extending about the axis.

6. The brush seal of claim 4, wherein the brush seal is a split ring extending about the axis.

7. The brush seal of claim 4, wherein the brush seal is formed from a plurality of segments arranged about the axis.

8. The brush seal of claim 1, wherein the first end is configured to seal against a first surface and the second end is configured to seal against a second surface.

9. The brush seal of claim 8, wherein the first surface is a generally radial surface and the second surface is a generally axial surface.

10. The brush seal of claim 8, wherein the first and second surfaces are within a blade outer air seal assembly.

11. A blade outer aft seal assembly, comprising: a blade outer air seal having a plurality of segments extending circumferentially about an axis and mounted in a carrier; at least one of the plurality of segments having a base portion extending from a first axial side to a second axial side; and a brush seal arranged at one of the first and second axial sides, the brush seal having a plurality of bristles having a first end and a second end, wherein the first end is arranged at an angle relative to the second end, wherein the first end is engaged with the at least one segment and the second end is engaged with another structure, and a first plate has a tab that extends from the first plate and is in engagement with a carrier.

12. The blade outer air seal assembly of claim 11, wherein the angle is between about 90° and about 170°.

13. The blade outer air seal assembly of claim 11, wherein the angle is about 90°.

14. The blade outer air seal assembly of claim 11, wherein the plurality of bristles are arranged between the first plate and a second plate, the first and second plates are shaped to form the angle.

15. The blade outer air seal assembly of claim 11, wherein a gap is formed between the second plate and the bristles to permit the bristles to move relative to the first and second plates.

16. The blade outer air seal assembly of claim 11, wherein the another structure is a generally radial surface.

17. The blade outer air seal assembly of claim 11, wherein the at least one segment is formed from a ceramic material.

18. The blade outer air seal assembly of claim 17, wherein the plurality of bristles are a cobalt material.

19. The blade outer air seal assembly of claim 11, wherein the plurality of bristles comprises a first group and a second group, the first group having the first end and the second group having the second end.

20. The blade outer air seal assembly of claim 11, wherein the first plate extends generally axially and has a radial rail.

* * * * *